United States Patent
Kleen et al.

(10) Patent No.: US 11,225,910 B2
(45) Date of Patent: Jan. 18, 2022

(54) LOAD ANTICIPATOR SYSTEM FOR A GENERATOR SYSTEM

(71) Applicant: General Electric Company, Schenectady, NY (US)

(72) Inventors: Randall Kleen, Channelview, TX (US); Esmeralda Soto, Queretaro (MX)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/674,259

(22) Filed: Nov. 5, 2019

(65) Prior Publication Data
US 2021/0131351 A1    May 6, 2021

(51) Int. Cl.
*F02C 7/32* (2006.01)
*F01D 15/10* (2006.01)

(52) U.S. Cl.
CPC ............... *F02C 7/32* (2013.01); *F01D 15/10* (2013.01); *F05D 2220/32* (2013.01)

(58) Field of Classification Search
CPC .... F02C 7/32; F02C 6/02; F01D 15/10; F01D 19/00; F05D 2220/32
See application file for complete search history.

(56) References Cited

U.S. PATENT DOCUMENTS

| | | | |
|---|---|---|---|
| 7,170,262 B2* | 1/2007 | Pettigrew | H02P 9/42 322/32 |
| 8,816,521 B2 | 8/2014 | Kleen et al. | |
| 10,060,349 B2 | 8/2018 | Morales et al. | |
| 2004/0129020 A1* | 7/2004 | Jones, Jr. | C10L 3/102 62/612 |
| 2006/0220387 A1 | 10/2006 | Tsuzuki | |
| 2011/0175372 A1* | 7/2011 | Eaton | F02D 29/06 290/40 B |
| 2012/0313372 A1 | 12/2012 | Bjerknes et al. | |
| 2016/0356171 A1 | 12/2016 | Thet et al. | |
| 2019/0027939 A1 | 1/2019 | Kleen et al. | |
| 2020/0239156 A1* | 7/2020 | White | B64D 41/00 |

FOREIGN PATENT DOCUMENTS

WO    2015133994    9/2015

OTHER PUBLICATIONS

PCT Application No. PCT/US2020/056858 International Search Report and Written Opinion, dated Feb. 12, 2021, 14 pgs.

* cited by examiner

*Primary Examiner* — Viet P Nguyen
(74) *Attorney, Agent, or Firm* — Fletcher Yoder, P.C.

(57) ABSTRACT

Systems and methods include an AC motor and one or more gas turbine generators configured to provide electrical power to the AC motor. The system also includes a controller configured to control operation of the one or more gas turbine generators by determining that the AC motor is to be started using the electrical power. Upon a determination that the AC motor is to be started using the electrical power, the controller is configured to boost the electrical power prior to starting the AC motor. The controller uses the boosted electrical power to pre-compensate for a drop in an electrical parameter of the electrical power due to an increased demand for the startup of the AC motor.

15 Claims, 5 Drawing Sheets

LOAD ANTICIPATOR SYSTEM FOR A GENERATOR SYSTEM

BACKGROUND OF THE INVENTION

The subject matter disclosed herein relates to the use of gas turbine engines in powering a load. Specifically, gas turbine engines are used to generate energy that can be converted to electrical energy.

In general, gas turbine engines combust a mixture of compressed air and fuel to produce combustion gases. The combustion gases may flow through one or more turbine stages to generate power for a load and/or a compressor. Gas turbines may be used to power a generator, which provides electrical energy to loads and/or motors. However, some states (e.g., bump starts) of some loads may put a large (e.g., 30-80 MW) and nearly instantaneous demand (e.g., 0.5-1.5 s) on gas turbine generators systems such that the gas turbine generator systems may not be able to sufficiently provide power at rated operating parameters, due to potential frequency and/or voltage sag—brown out.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below. In a first embodiment, a system includes an AC motor and one or more gas turbine generators configured to provide electrical power to the AC motor. The system also includes a controller configured to control operation of the one or more gas turbine generators by determining that the AC motor is to be started using the electrical power. Upon a determination that the AC motor is to be started using the electrical power, the controller is configured to boost the electrical power prior to starting the AC motor. The controller uses the boosted electrical power to pre-compensate for a drop in an electrical parameter of the electrical power due to an increased demand for the startup of the AC motor.

In a second embodiment, a system includes a high-power load and a turbine generator configured to provide electrical power to the high-power load. The system also includes a controller, which, upon a determination that the high power load has a scheduled sharp increase in demand, boosts one or more aspects of the electrical power to pre-compensate for a drop in the one or more aspects of the electrical power due to the scheduled sharp increase in demand for electrical power. The controller may also determine a decrease in demand for power by the high-power load, and may effect a reduction in one or more aspects of the electrical power.

In a third embodiment, a tangible, non-transitory, and computer-readable medium storing instructions that when executed by a processor, cause the processor to manage an operation of a gas turbine system to generate electrical power. The processor, executing the instructions, may also determine that a motor is to be started in accordance with a scheduled start. Further, the processor may increase at least one parameter of the generated electrical power before starting the motor and start the motor using the increased at least one parameter of the generated electrical power to pre-compensate for a drop in the at least one parameter of the generated electrical power.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers; specific goals, such as compliance with system-related and business-related constrains, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, the term "or" is intended to be inclusive indicating that A or B includes A alone, B alone, or both A and B.

The present disclosure is generally directed to starting AC motors using generators that are powered by gas turbine generators. When starting a high-power (e.g., 30 kilo horsepower (k Hp)) AC motor (or other high-demand instantaneous load), the gas turbine generator may have demand spike to a point that an output parameter (e.g., frequency or voltage) may drop. In these high-demand load(s), a ramped demand over time may be impossible or impractical to implement due to costs or increased complexity to the systems containing the high-demand load(s). Instead of ramping demand, the systems may pre-compensate for this drop. During pre-compensation, the generator may be given a boost in power before starting the high-power AC motor. This boost in power also increases one or more of the parameters at which the generator operates that are subject to the drop of the output parameter. In giving the generator a boost in power before the start of an AC motor, the generator is able to prepare for an increase in power demand and may respond to the increase in power demand in a stable fashion that allows the generator to quickly recover its steady state, equilibrium operation (e.g., rated operating frequency and voltage) while powering up the AC motor or other load attached to it.

Figure 1:
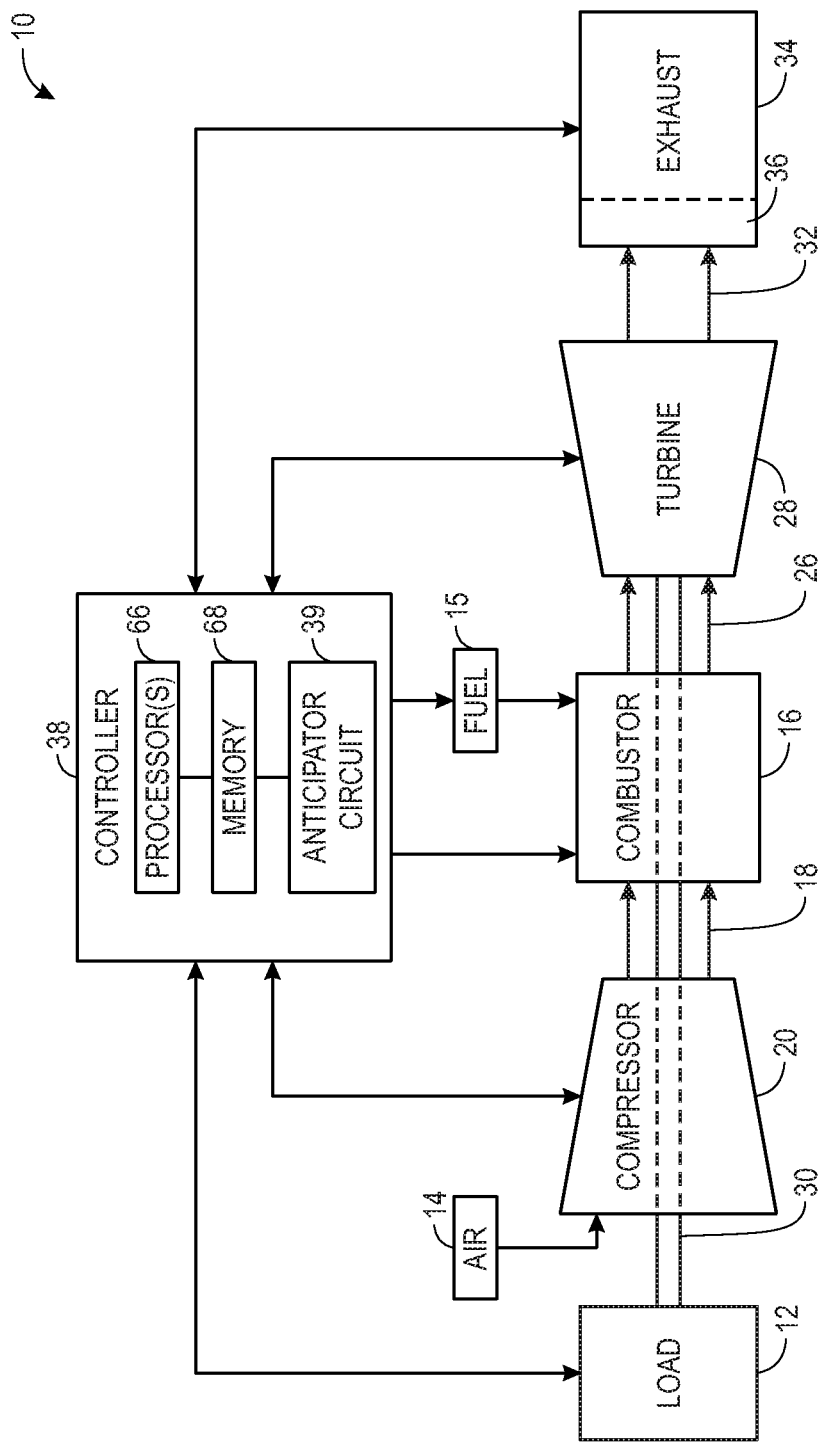
FIG. 1 is a block diagram of a gas turbine engine configured to power a load, in accordance with an embodiment of the present disclosure.

According to present embodiments, these and other processes may be performed or facilitated by a generator that is powered by a gas turbine system. FIG. 1 is a block diagram of an embodiment of a gas turbine system 10. As an example, the gas turbine system 10 may be part of a combined cycle system or combined with other gas turbine engines 10 to power one or more loads 12. Specifically, the gas turbine system 10 is generally configured to drive the load 12 by combusting a mixture of compressed air and fuel 15 (e.g., natural gas, light or heavy distillate oil, naphtha, crude oil, residual oil, or syngas). The combustion is performed within a combustor 16, which may include one or more combustion chambers. Air 14 goes into an air intake at the compressor 20, is filtered, and then is compressed in the compressor 20 via one or more compression stages.

To begin the combustion process within the combustor 16, the air 14 is injected into the compressor 20 through a compressed air stream 18. The compressed air stream 18 is mixed with fuel 15. Using the mixture of the fuel 15 and the air 14, ignition may occur. The ignition produces hot combustion gases 26 that power the gas turbine system 10. More specifically, the hot combustion gases 26 flow through a turbine 28 with one or more compression stages that drives the load 12 via a shaft 30. For example, the combustion gases 26 may apply motive forces (e.g., via convection, expansion, and the like) to turbine rotor blades within the turbine 28 to rotate the shaft 30. In an example process, the hot combustion gases 26 may force turbine blades in the turbine 28 to rotate the shaft 30 along an axis of the gas turbine system 10. As illustrated, the drive shaft 30 may be connected to various components of the gas turbine system 10, including the compressor 20 or the load 12.

As previously noted, the drive shaft 30 may connect the turbine 28 to the compressor 20 to form a rotor. The compressor 20 may include compressor blades coupled to the drive shaft 30. Thus, rotation of turbine blades in the turbine 28 may cause the drive shaft 30 connecting the turbine 28 to the compressor 20 to rotate the compressor blades within the compressor 20. This rotation of compressor blades in the compressor 20 causes the compressor 20 to compress air 14 to generate the compressed air stream 18. As previously noted, the compressed air stream 18 is then fed to the combustor 16 and mixed with other combustion components. The shaft 30 may drive the compressor 20 in addition to or in lieu of the load 12. As an example, the load 12 may be a generator, a propeller, a transmission, or a drive system, among others.

Once the turbine 28 extracts work from the hot combustion gases 26, a stream of exhaust gas 32 may be provided to an exhaust section 34, where the exhaust gas 32 may be cooled or further processed. For example, the exhaust section 34 may include a catalyst section 36 which includes a carbon monoxide (CO) catalyst, a NOx catalyst, an unburned hydrocarbon catalyst, or any similar metal-based catalyst (e.g., platinum-based catalysts). For example, in the illustrated embodiment, the catalyst section 36 may include a NOx catalyst that is configured to destroy NO, gases within the stream of exhaust gas 32 or a CO catalyst. The stream of exhaust gas 32 may then exit the exhaust section 34.

As illustrated, gas turbine system 10 includes a controller 38. The controller 38 may include one or more processors 66 and memory 68, which may be used collectively to support an operating system, software applications and systems, and so forth, useful in implementing the techniques described herein. Particularly, the controller 38 may include code or instructions stored in a non-transitory machine-readable medium (e.g., memory 68) and executed, for example, by the one or more processors 66 that may be included in the controller 38. The processor(s) 66 may receive parameters of operation from the various components of the gas turbine system 10 include shaft rotation speed, frequency of electric power generated by the gas turbine system in a generator driven by the shaft 30, a voltage of the electric power, a demand from one or more load(s) 12, or other suitable parameters. In some embodiments, some parameters are measured directly while other parameters are determined indirectly from other measurements. For example, in certain embodiments, the controller 38 may utilize an algorithmic model or look-up table (e.g., stored in memory) to derive various parameters, such as the operating speed of the shaft 30 or a connected generator using electrical parameters such as frequency or voltage of the electric power generated by the generator. Further, the controller 38 may monitor operation of various parts of the gas turbine system 10. The monitored parameters may be used to control (e.g., adjust) operating parameters of one or more aspects of the gas turbine system 10.

As illustrated, the controller 38 may include an anticipator circuit 39 that anticipates a large increase of demand. The anticipator circuit 39 causes the controller 38 to pre-boost the output of the gas turbine system 10 and a connected generator. As previously noted, this pre-boost pre-compensates for electrical parameter reductions that the generator incurs in response to the large demand. The anticipator circuit 39 may include a physical circuit or may be at least partially embodied using the instructions stored in memory 68 and running on the processor 66 of the controller 38.

Figure 2:
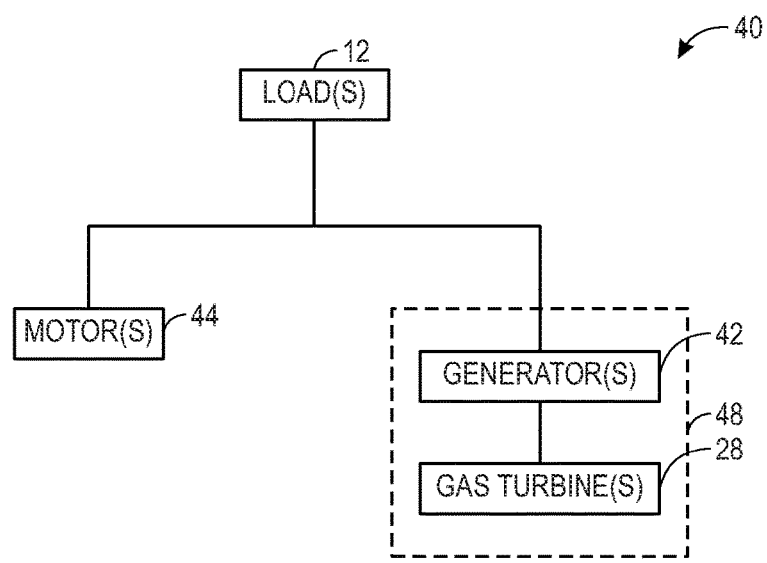
FIG. 2 is a block diagram of a gas turbine engine configured to provide power to a generator which powers one or more motors and loads, in accordance with an embodiment of the present disclosure.

FIG. 2 is a schematic diagram 40 of the gas turbine(s) 28 driving generator(s) 42 that power load(s) 12 or motor(s) 44. The motor(s) 44 may include electric motor(s) powered by current generated in the generator(s) 42. Each gas turbine 28 and generator 42 may together form a gas turbine generator 48. The shaft 30, which rotates due to the torque generated using the gas turbine 28 may be connected to a respective generator 42. The rotation of the gas turbine 28 may power the respective generator 42. More specifically, a gas turbine 28 is connected to a rod (e.g., coupled to the shaft 30) in the generator 42 that may be used to generate electricity through a magnetic induction mechanism in the generator 42. The generator produces electrical energy by converting the rotational energy it receives from the shaft 30 into electrical energy. In other words, the generator converts the rotational energy to electrical energy using magnetic induction. Due to the principle of magnetic induction, electrical charges may be induced by moving a conductor through a magnetic field. The generator 42 exploits this principle by rotating the shaft 30 through a magnetic field or by causing one or more magnets to move in a magnetic field in the generator 42. This motion may induce electricity that can be used to power the load(s) 12 or the motor(s) 44 that are attached to the generator 42. Further, the generator 42 may be electrically connected to one or more motor(s) 44 or load(s) 12. Via this electrical connection, the generator 42 may provide the electrical energy to operate the motor(s) 44. As may be appreciated, the AC electricity generated by generator 42 may have a frequency determined by the rotation of the magnet, which the rod of the generator 42 may rotate. This rotation provides the torque to turn the magnet that is displaced in the magnetic field at the rate that provides the frequency of the AC electricity. As will be discussed below, when a load demand increases rapidly (e.g., nearly instantaneous), the attempt to provide for a large nearly instantaneous demand may cause one or more parameters (e.g., frequency and/or voltage) of the electrical output of the generator 42 to drop. The anticipator circuit 39 at least partially pre-compensates for this degradation/drop of electrical parameters in response to the large demand. Further, the anticipator circuit 39 can be enabled and active at any time to prepare for a large in-rush of current to motor(s) 44 (e.g., AC motor(s)).

Figure 3:
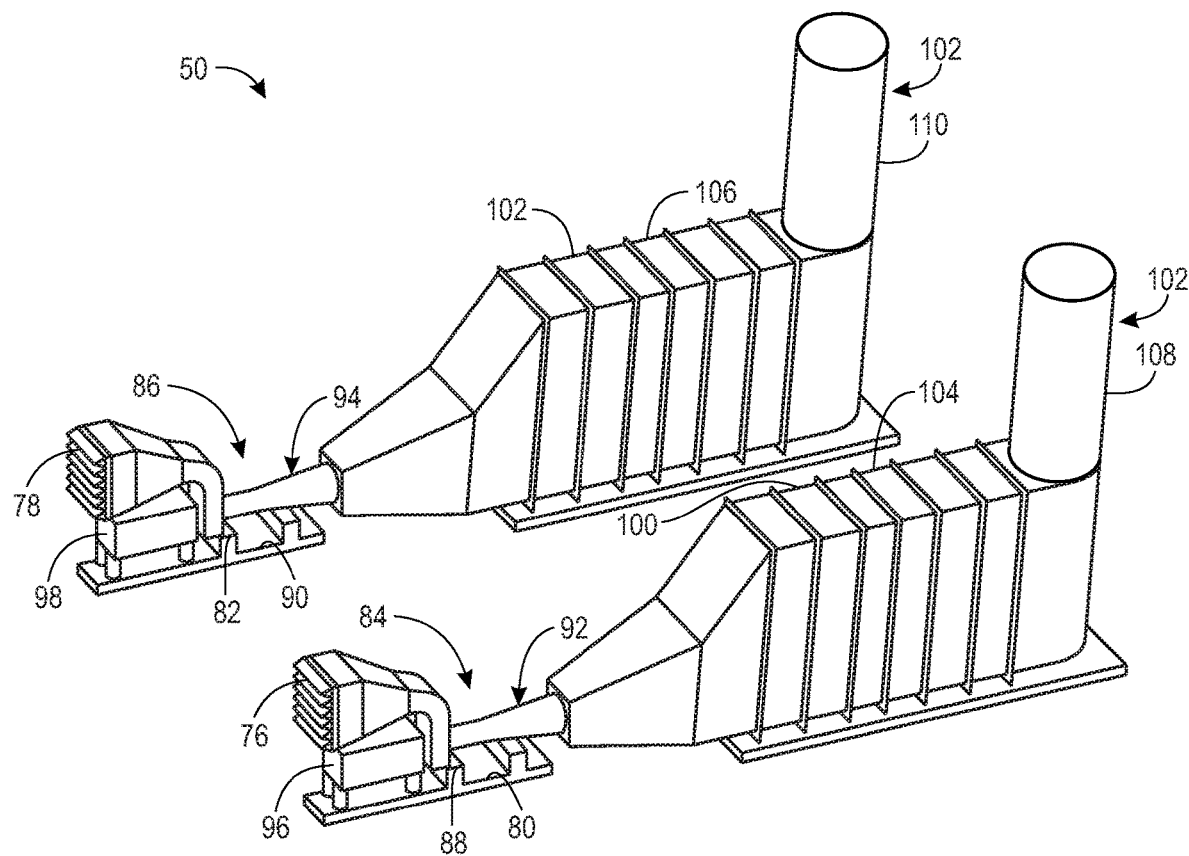
FIG. 3 is a perspective view of two gas turbine engines configured to power one or more loads, in accordance with an embodiment of the present disclosure.

As previously noted, the techniques herein may be applied to systems including two or more turbines. FIG. 3 is a perspective view of a gas turbine system 50 that has two gas turbines operating in parallel with each other. During the operation of the gas turbine system 50, multiple generators (which convert energy from gas turbine engines 52, 54) may be connected to a bus to power the motor(s) 44 or the load(s) 12. Some loads may demand too much power from one generator and or one gas turbine. The multiple generators operating connected in parallel on a bus may aid in meeting large power demands and in powering generators that may endure sharp increases in power demand such as what may occur when starting a high-power AC motor.

In the operation of the gas turbine system 50, air intakes 76 and 78 ingest air (e.g. ambient air). A first air compressor 80 (e.g., one or more compression stages) of the first gas turbine engine 52 and a second air compressor 82 (e.g. one or more compression stages) of the second gas turbine engine 54 compress the ingested air to generate compressed air.

Combustion of fuel (such as the fuel 15) within the first and second gas turbine engines 52 and 54 is performed within respective first and second combustors 88 and 90. Further, each combustor 88, 90 may include multiple combustion chambers. Once the combustion gases have been produced within the first and second combustors 88 and 90, they are respectively sent to a first gas turbine 92 of the first gas turbine engine 52 and a second gas turbine 94 of the second gas turbine engine 54, where work is extracted from the hot combustion gases as described above with respect to FIG. 1. The work extracted by the first and second gas turbines 92 and 94 may result in rotation of one or more features, such as a shaft connecting the gas turbines 92, 94 to respective loads 96 and 98. Alternatively or additionally, the gas turbines 92 and 94, by extracting work from the combustion gases produced within the combustor 88 and 90, may drive the respective compressors 80, 82 of the first and second gas turbine engines 52 and 54 along with any other loads such as a generator, propeller, and the like.

While the system 50 has been described as having two gas turbine engines (the first gas turbine engine 52, the second gas turbine engine 54), it should be noted that the present approaches are also applicable to systems employing any number of gas turbines engines to power one or more generators.

As previously noted, a respective gas turbine 28 and generator 42 pair may be arranged in a single unit (e.g. gas turbine generator 48) or they may be separate machines that are connected to each other. Further, the gas turbine generator 48 may contain one or more controller mechanisms (e.g., the controller 38) to regulate various parameters of the generator 42 (e.g. voltage, frequency, etc.), of the gas turbine 28, or of both the generator 42 and the gas turbine 28. As previously noted, the generator 42 may be electrically connected to motor(s) 44 to provide energy for it to operate. Further, in order to obtain an efficient transfer of power to the motor(s) 44 that is to be started, the generator(s) 42 may be configured to match the reactance and impedance of the motor 44 and/or other motors and loads of the system 10. Configuring the circuit elements of the generator(s) 42 such that the reactance and impedance are matched in value may allow for an efficient transfer of power between the generator(s) 42 and the motor(s) 44.

As previously noted, the gas turbine system 10 may include more than one gas turbine with more than one shaft. A multi-shaft configuration may allow for a greater range of load accept shot capabilities due to a constant flow of combustion at a given free turbine speed. However, multi-shaft, free-wheeling power turbines may still have limited load accept shot capabilities, especially when operating at a light power demand. When a gas turbine is operating with a light load, and then suddenly experiences an increase in power demand (e.g., starting motor(s) 44), there is a limited amount of power demand that the generator(s) 42 can meet before it may experience current saturation or excessive torque in the process of attempting to meet the new power demand and stabilize itself. Saturation may occur when coils in the generator(s) 42 are saturated with current such that the addition of more current does not increase a magnetic field magnitude, but rather, results in a dissipation of energy (e.g., heat). Excessive torque may be applied on rotors in a generator when a gas turbine attempts to meet the increased power demand by providing more power through applying excessive torque to the generator(s) 42. An over-torque may result in damage to the generator(s) 42 or in eventual stalling of the generator(s) 42. For example, as will be discussed below, the frequency of the generator(s) 42 may decrease below a certain threshold frequency. Beyond the threshold frequency the gas turbine generator 48 may not be able to stabilize to power the motor(s) 44 to which it is electrically connected and runs a risk of saturating and/or experiencing excessive torque.

To prepare for a large demand of power, the gas turbine generator 48 may increase operating parameters or aspects of outputs of one or both of the gas turbine(s) 28 and generator(s) 42. In accordance with an example, the generator frequency and the output voltage of the generator 42 may be increased before powering the motor(s) 44 that will receive power from the gas turbine generator 48. In this way, the generator(s) 42 may prepare for the demand of the load, increase its load shot capabilities, and increase its transient speed.

Figure 4:
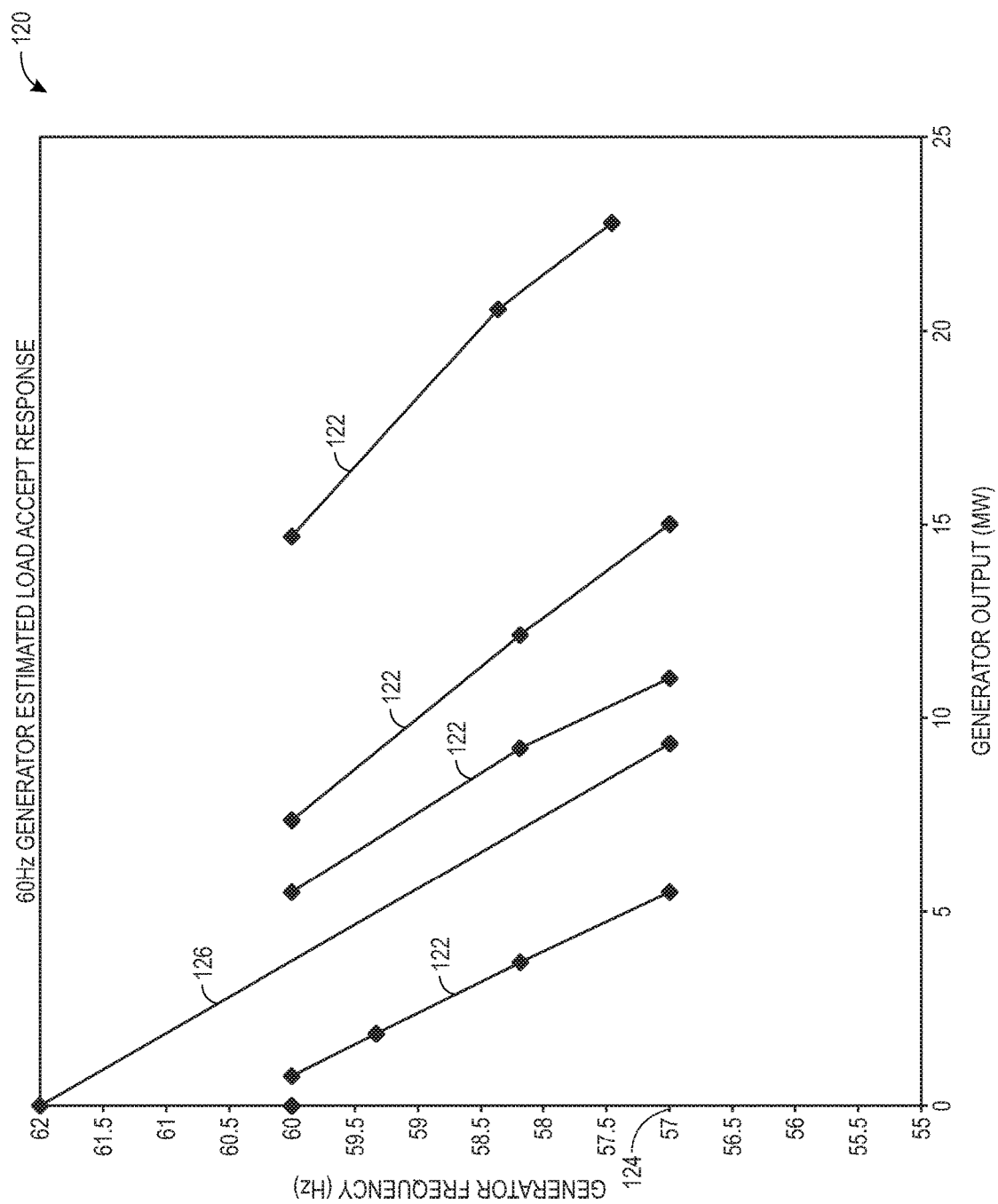
FIG. 4 is a graph of generator frequency versus generator power output, in accordance with one embodiment of the present disclosure.

FIG. 4 illustrates an example graph 120 plotting a generator frequency versus generator power output. The frequency of the generator is measured in Hertz (Hz), and the power output of the generator output is measured in Megawatts (MW). Graph 120 displays the load accept response of a generator that is rated for a frequency of 60 Hz and a voltage of 13.8 kV, and can be configured for a plurality of voltage and frequency selections. As mentioned earlier in this discussion, when a generator receives a load increase, the load may destabilize some parameters of the generator (e.g., frequency, current, voltage, power output, etc.) due to the increased power demand that the generator experiences especially when starting at low load conditions. As shown in graph 120, when a load for the generator(s) 42 increases, the power output of the generator(s) 42 increases as it attempts to meet the increased power demand. In the graph 120, as the power output of the generator(s) 42 increases to meet the new demand for power, the frequency of generator(s) 42 decreases, as illustrated by a negative slope of lines 122. The frequency of the generator(s) 42 may initially decrease because of the surge of energy transferred from the generator(s) 42. The frequency of the generator(s) 42 may correspond to an electrical frequency at which the current in the generator alternates. Further, there may be a minimum threshold frequency 124 below which the generator(s) 42 may not be able to recover. Below the minimum threshold frequency 124, the generator(s) 42 may saturate or experience excessive torque from the gas turbine. For example, in FIG. 4, the minimum threshold frequency 124 corresponds to 57 Hz. However, the minimum threshold frequency shown in FIG. 4 is for illustrative purposes and is to be no means limiting to a particular value such as 57 Hz. Other minimum threshold frequencies exist based on factors including the frequency rating of the generator, temperature, and the like.

In some embodiments, the startup of the AC motor (e.g., motor(s) 44) may be initiated without the AC motor having an initial angular momentum. Such a startup (e.g., starting a motor that lacks initial angular momentum) may utilize a large surge of power to start the motor(s) 44 and then to stabilize the generator(s) 42 at the new level of demand. To accommodate for this larger surge, the generator(s) 42 may use an increased load shot acceptance capability to start the motor(s) 44 with the large surge of power.

The increased load shot acceptance capability may be provided by pre-compensating for changes in parameters of the power provided by the generator(s) 42. Line 126 tracks the frequency of an output of the generator(s) 42 using pre-compensation by increasing the frequency or voltage of the generator(s) 42. For instance, as illustrated, when the generator(s) 42 outputs power at a voltage level of 13.8 kV and a frequency level of 60 Hz, the generator(s) 42 may operate for a period of time prior to the startup of the motor(s) 44 at a voltage level of 14.1 kV and a frequency level of 62 Hz. By increasing the frequency and voltage of this generator to operate above 1 PU (per-unit) (e.g., at about 1.03 times) PU (per-unit) for a threshold period (e.g., 10, 15, 20 seconds) before the startup of the motor(s) 44, the power output of the generator(s) 42 is increased to enable for a greater load acceptance capability. In fact, the power output of the generator(s) 42 may be able to reach levels even double the initial power output and still be able to stabilize after meeting the load demand surge. This increase in power output at one or more aspects (e.g., frequencies or voltages) may be able to improve the load acceptance of the generator(s) 42 and quicken the speed of recovery of the generator(s) 42. Thus, as previously noted, to start a motor(s) 44 with no initial angular momentum or other situations where the load may require a large power surge, the anticipator circuit 39 may prepare the generator(s) 42, the gas turbine(s) 28, or the gas turbine generator 48 by increasing one or more of its operating parameters (e.g., frequency, voltage, etc.) before the startup of the motor 44. The increase in the operating parameter values of the generator(s) 42 may provide the additional energy to meet the load demand in the process of the start-up or transient event.

Figure 5:
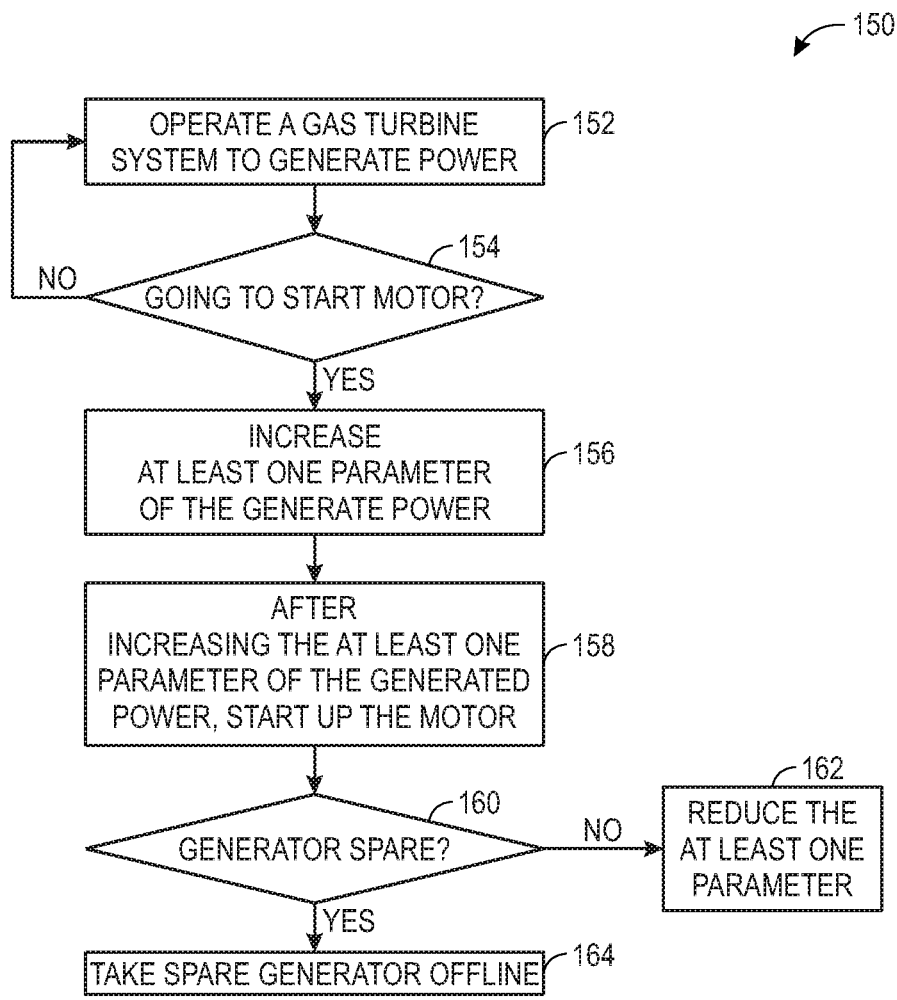
FIG. 5 is a flow chart of anticipating an increased power demand in operating a gas turbine generator to pre-compensate for the increased power demand, in accordance with one embodiment of the present disclosure.

FIG. 5 is a flow chart that shows a process 150 for starting the motor 44 with the anticipator circuit 39 connected to the gas turbine system 10. At block 152, the controller 38 operates the gas turbine system 10 to generate power. At block 154, the anticipator circuit 39 determines whether the motor 44 is to be started. For example, the anticipator circuit 39 or the controller 38 may obtain access to an operation schedule for the motor 44. If the motor 44 is not to be started, the power may continue to be generated at present demand. At block 156, if the motor 44 is about to be started, at least one parameter of the generated power is increased. The parameters that may be increased include frequency, voltage, or other parameters of the generated power. These parameters may be increased simultaneously or consecutively before the generator(s) 42 experiences the increased demand. Further, in some embodiments, only one parameter of the generated power is increased, while in other embodiments, more than one parameter is increased.

At block 158, after increasing the at least one parameter of the generated power, the motor 44 is given power to start up. The at least one parameter that is increased may be able to provide the additional energy the generator(s) 42 needs to sustain the increased load demand on the generator(s) 42 during the transient event. Moreover, as mentioned earlier, more than one generator 42 may be connected to the buses by which electricity travels to the motor 44 that is being started.

At block 160, after the generator(s) 42 have successfully met the power demand of starting the motor(s) 44, the controller 38 may determine whether a spare generator was used to initiate the motor 44. The spare generator may provide power above what is used to operate the motor(s) 44 and load(s) 12. For example, when the spare generator is used, it may be turned on to provide the additional power before starting the motor 44.

At block 162, if there is no spare generator on the bus, the at least one parameter of the generated power which was increased at block 156 may be reduced from the generator(s) 42. At block 164, if a spare generator was used in the process of starting the motor 44, the spare generator may be taken offline (e.g. turned off or electrically disconnected from the bus and wires which carry electricity to the motor). It may be noted that more than one spare generator may be used in the process of starting the motor 44.

Figure 6:
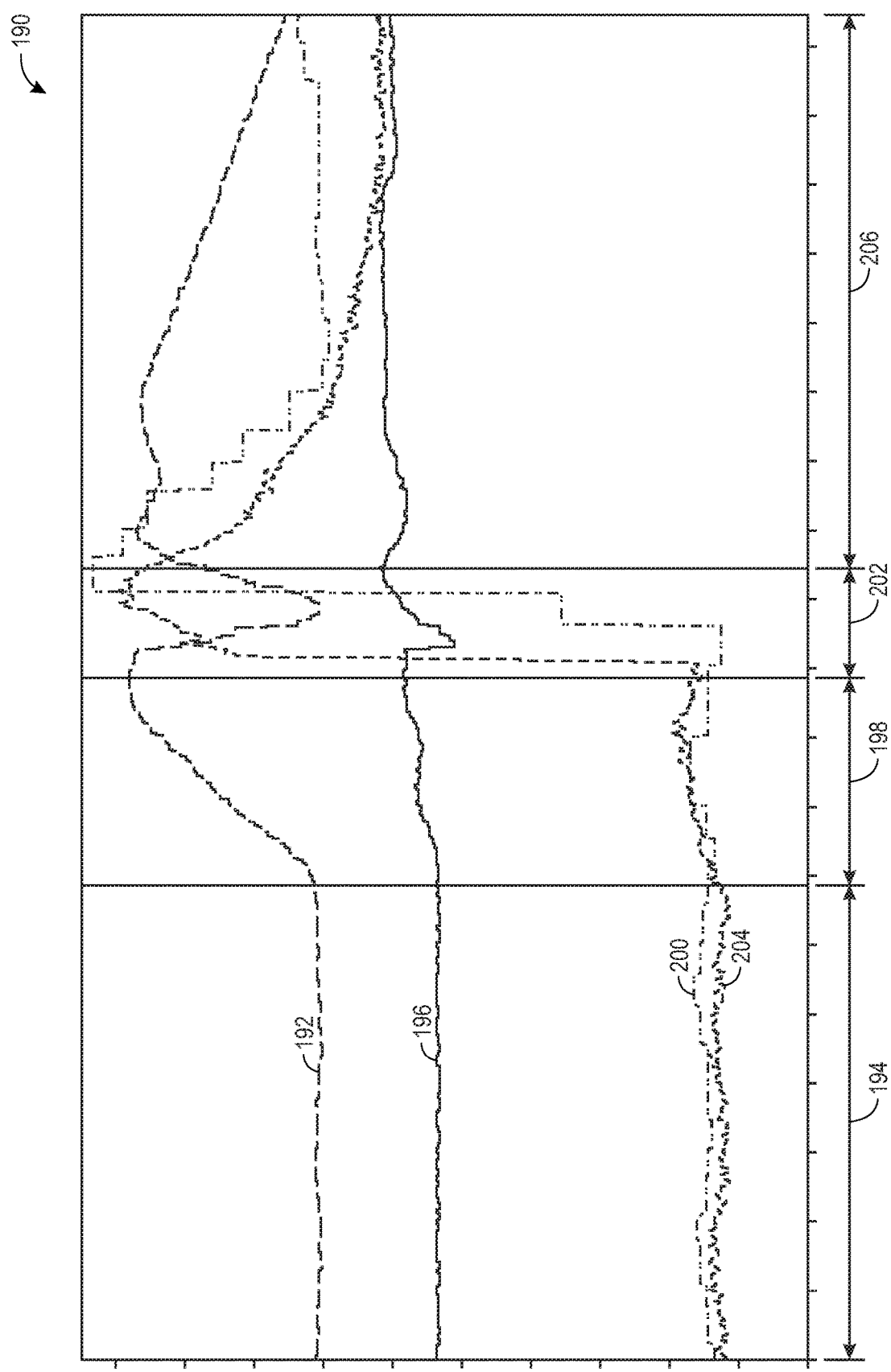
FIG. 6 illustrates a graph of various electrical parameters of circuit elements before, during, and after a gas turbine generator powers a load using a pre-compensation for a power load demand on the gas turbine generator, in accordance with one embodiment of the present disclosure.

As mentioned previously, when the generator(s) 42 begin to power the motor 44, the generator(s) 42 may be disturbed from a steady state or equilibrium due to the attempt to meet increased demand. FIG. 6 displays a graph 190 with multiple lines that represent parameters of the gas turbine system 10, the generator(s) 42, and the motor(s) 44 before, during, or after a transient event of an increase in power demand on a generator.

Line 200 corresponds to a power output of the generator(s) 42. Line 204 corresponds to the power demand on the generator(s) 42 from the various circuit elements electrically attached to the generator(s) 42 (e.g., load(s) 12 and motor(s) 44). Graph 190 shows time periods: a pre-startup period 194, a pre-emphasis period 198, a startup period 202, and a post-startup period 206. In the pre-startup period 194, the generator(s) 42 is operating in a steady state. In the pre-startup period 194, the generator(s) 42 may be operating according to rated frequencies (e.g., 50 or 60 Hz) and at respective rated voltages (e.g., 11.5 kV or 13.8 kV) in the moments before the start of a motor. Further, the generator(s) 42 may already be connected to load(s) 12 or motor(s) 44 and is capable of sustaining power demand by remaining in a relative steady state status.

In accordance with the present embodiments, in the pre-emphasis period 198, the generator(s) 42 may be controlled to increase one or more of its operating parameters in order to prepare for starting up the motor 44. A duration of the pre-emphasis period 198 corresponds to a time period before the startup of the motor that is used to ramp one or more parameters of the generated power to a higher level to pre-compensate for drops in one or more parameters of the generated power from the generator(s) 42. This pre-emphasis period 198 may have a duration sufficient to enable the generator(s) 42 to reach an output pre-emphasis level. The output at the pre-emphasis level corresponds to increased operating values of one or more parameters of the generated power (e.g., line 192 and line 196 in pre-emphasis period 198). During the pre-emphasis period 198, the generator(s) 42 begins to increase its frequency (as shown on line 192) and voltage (as shown on line 196) such that the generator may operate at a level above its rated frequency in the time before experiencing the new power demand.

Further, the power demand and output (lines 204 and 200, respectively) of the generator may be increased as part of the startup of the motor 44 during the startup period 202. The generator(s) 42 may be instructed by the controller 38 to increase one or more of its operating parameters (e.g., frequency and voltage) before the startup period 202 to pre-compensate for drops in the one or more of its operating parameters in the attempt to meeting the increased demand during the startup period 202. In the startup period 202, the frequency of the generator(s) 42 illustrated by the line 192 sharply drops in the transient event. The frequency may drop abruptly at least partially due to a demand to supply the large transfer angular momentum to the motor(s) 44 that are being started with no initial angular momentum. To start the motor(s) 44 that have no initial angular momentum, a large transfer of energy may be used. Through a series of conversions of energy, the motor(s) 44 may obtain the energy to start. That is, the generator(s) 42 provides electrical energy to the motor(s) 44. The electrical energy that the motor(s) 44 to be started receives from the generator(s) 42 may be converted to rotational kinetic energy, which provides the motor(s) 44 with torque to change (e.g., increase) the angular momentum of the motor(s) 44. The voltage illustrated by the line 196 of the generator(s) 42 also experiences a sharp drop due to the demand illustrated by the line 200 and the resultant power output illustrated by the line 200. The generator(s) 42 may be characterized as being out of equilibrium, unstable, or out of steady state in the startup period 202. In the post-startup period 206, the increased demand of the power for the startup reduces down from a peak level used to supply the lack of initial angular momentum in the motor 44 when the motor 44 starts up. The increased demand (of the startup) decreases in the post-startup period 206 at least partially due to the increased ease (e.g., decreased torque) of retaining the angular momentum of motor 44 after the motor 44 is started with no angular momentum. Thus, it may require a larger amount of torque applied in motor 44 from the energy originating from the generator(s) 42 to increase the angular momentum of the motor 44 from no initial angular momentum than the amount of torque applied in the motor 44 to maintain the angular momentum of the motor 44 at a relatively constant finite value.

Using the pre-compensation, the generator(s) 42 are better equipped to recover from the transient of event in startup period 202 of meeting the increased power demand. This is true since one or more parameters of the generated power is increased in preparation for the increase in power demand, causing the generator(s) 42 to stay within operational limits. For instance, the pre-compensation insures that the generator frequency does not drop below the minimum frequency threshold 124 during startup of the motor 44, blocking the generator(s) 42 from saturating.

Typically, more power may be needed to start the motor than to keep it running, so the motor may require a large initial amount of power. As shown in FIG. 6, the output power greatly increases in the time between pre-emphasis period 198 and startup period 202. However, after the motor has gained rotational kinetic energy and angular momentum, the power output of the generator(s) 42 may decrease as shown in the post-startup period 206 to track the decrease in power demand. As a result of the decreased output, other parameters of the generator such as frequency and voltage may also decrease.

Although the foregoing discusses gas turbines driving generators, similar principles may be applied to any generator system that uses a prime mover that drives a generator. Specifically, the techniques disclosed herein may be useful for any generator system that may undergo large nearly instantaneous demand that may degrade at least one parameter of an output of electrical power from the generator system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   an AC motor;
   one or more online gas turbine generators configured to provide electrical power to the AC motor;
   an offline gas turbine generator configured to work with the one or more online gas turbine generators to provide additional electrical power in anticipation of excess demand for starting the AC motor; and
   a controller configured to control operation of the one or more online gas turbine generators and of the offline gas turbine generator by:
   determining that the AC motor is to be started using the electrical power;
   determining a reactance value and an impedance value of the AC motor for starting the AC motor;
   upon determination that the AC motor is to be started using the electrical power, boosting the electrical power prior to starting the AC motor by starting up the offline gas turbine generator, wherein starting up the offline gas turbine generator comprises taking the offline gas turbine generator online while the one or more online gas turbine generators remain online in anticipation of an increased demand due to the AC motor being started;

operating the one or more online gas turbine generators and the offline gas turbine generator to match the reactance value and the impedance value of the AC motor when the AC motor is started to provide the boosted electrical power;

using the boosted electrical power to pre-compensate for a drop in an electrical parameter of the electrical power due to the increased demand for a startup of the AC motor;

determining that the AC motor has reached a steady state after starting the AC motor; and upon determination that the AC motor has reached the steady state, reducing the boosted electrical power by shutting down the offline gas turbine generator.

2. The system of claim 1, wherein the determining that the AC motor is to be started comprises receiving a schedule for the startup of the AC motor.

3. The system of claim 1, wherein the electrical parameter comprises a frequency for the electrical power.

4. The system of claim 3, wherein boosting the electrical power comprises boosting the frequency.

5. The system of claim 1, wherein the electrical parameter comprises a voltage for the electrical power.

6. The system of claim 5, wherein boosting the electrical power comprises boosting the voltage.

7. The system of claim 1, wherein the controller is configured to reduce the boosted electrical power after the AC motor has completed the startup.

8. The system of claim 1, wherein the controller comprises an anticipator circuit configured to determine when the AC motor is to be started and to cause the electrical power to be boosted.

9. A system, comprising:
a load;
an online turbine generator configured to provide electrical power to the load;
an offline turbine generator configured to work with the online turbine generator to provide additional electrical power in anticipation of excess demand for starting the load; and
a controller configured to:
determine that the load has a scheduled increase in demand for the electrical power from the online turbine generator, wherein the scheduled increase in demand comprises a startup of an AC motor;
determine a reactance value and an impedance value of the AC motor for the startup of the AC motor;
upon determination that the load has the scheduled increase in demand, pre-boost one or more aspects of the electrical power by taking the offline turbine generator online while the online turbine generator remains online in anticipation of the scheduled increase in demand due to the load being started;
operate the online turbine generator and the offline turbine generator to match the reactance value and the impedance value of the AC motor when the AC motor is started;
using the pre-boosted one or more aspects of the electrical power to pre-compensate for a drop in the one or more aspects of the electrical power due to the scheduled increase in demand;
determine a decrease in demand for power by the load by determining that the load has achieved a steady state of operation; and
based at least in part on the decrease in demand for power, reduce the one or more aspects of the electrical power by taking the offline turbine generator back offline.

10. The system of claim 9, wherein the load comprises the AC motor.

11. The system of claim 9, wherein the startup comprises a bump start of the AC motor with no initial inertial movement of the AC motor.

12. The system of claim 9, wherein reducing the one or more aspects of the electrical power comprises reducing the one or more aspects back to pre-boost levels.

13. The system of claim 9, wherein the one or more aspects comprises a frequency of the electrical power, a voltage of the electrical power, or both.

14. The system of claim 9, comprising one or more additional loads receiving the electrical power from the turbine generator.

15. Tangible, non-transitory, and computer-readable medium storing instructions, that when executed by a processor, are configured to cause the processor to:
manage operation of a gas turbine system to generate electrical power using an online main generator and an offline auxiliary generator configured to work with the online main generator to provide additional electrical power to start a motor in anticipation of excess demand for starting the motor;
determine that the motor is to be started according to a scheduled start;
determine a reactance value and an impedance value of the motor for starting the motor;
increase at least one parameter of the generated electrical power prior to starting the motor by taking the offline auxiliary generator online while the online main generator remains online in anticipation of an increased demand due to starting the motor;
start the motor using the increased at least one parameter of the generated electrical power to pre-compensate for a drop in the at least one parameter due to the increased demand for starting the motor;
operate the online main generator and the offline auxiliary generator to match the reactance value and the impedance value of the motor when the motor is started;
determine that the motor has achieved a steady state by reaching an operating speed after being started; and
reduce the at least one parameter by taking the offline auxiliary generator offline based on determining that the motor has reached the operating speed.

* * * * *